US008406932B2

(12) United States Patent
Hollaway

(10) Patent No.: US 8,406,932 B2

(45) **Date of Patent: *Mar. 26, 2013**

(54) SPA CONTROL WITH IMPROVED HEATER MANAGEMENT SYSTEM

(75) Inventor: Jerrell P. Hollaway, Melbourne, FL (US)

(73) Assignee: Balboa Instruments, Inc., Tustin, CA (US)

( * ) Notice: Subject to any disclaimer, the term of this patent is extended or adjusted under 35 U.S.C. 154(b) by 454 days.

This patent is subject to a terminal disclaimer.

(21) Appl. No.: 12/661,185

(22) Filed: Mar. 12, 2010

(65) Prior Publication Data

US 2011/0219530 A1 Sep. 15, 2011

Related U.S. Application Data

(63) Continuation-in-part of application No. 12/586,712, filed on Sep. 28, 2009.

(51) Int. Cl.
*E04H 4/00* (2006.01)
*G05B 19/18* (2006.01)

(52) U.S. Cl. ........ 700/282; 700/299; 700/278; 700/276; 4/111.2; 4/493; 4/492; 4/541.1; 4/545; 219/490; 219/492; 219/493; 219/494; 219/437; 394/465; 236/21; 236/20 R; 392/485; 361/103

(58) Field of Classification Search .................. 700/282; 4/111.2, 493, 492; 219/490, 492–494, 437
See application file for complete search history.

(56) References Cited

U.S. PATENT DOCUMENTS

| | | | | |
|---|---|---|---|---|
| 5,056,712 | A * | 10/1991 | Enck | 236/20 R |
| 5,361,215 | A | 11/1994 | Tompkins et al. | |
| 5,550,753 | A | 8/1996 | Tompkins et al. | |
| 5,559,720 | A | 9/1996 | Tompkins et al. | |
| 6,253,227 | B1 | 6/2001 | Tompkins et al. | |
| 6,282,370 | B1 | 8/2001 | Cline et al. | |
| 6,590,188 | B2 | 7/2003 | Cline et al. | |
| 6,756,907 | B2 * | 6/2004 | Hollaway | 340/635 |
| 6,965,815 | B1 | 11/2005 | Tompkins et al. | |
| 6,976,052 | B2 | 12/2005 | Tompkins et al. | |
| 6,976,636 | B2 * | 12/2005 | Thweatt, Jr. | 236/21 B |
| 7,440,864 | B2 * | 10/2008 | Otto | 702/119 |
| 2005/0167419 | A1 * | 8/2005 | Brochu et al. | 219/494 |
| 2005/0177281 | A1 * | 8/2005 | Caves et al. | 700/276 |
| 2006/0162719 | A1 * | 7/2006 | Gougerot et al. | 126/374.1 |
| 2006/0238931 | A1 * | 10/2006 | Cline et al. | 361/42 |
| 2007/0058315 | A1 * | 3/2007 | Maddox | 361/103 |
| 2007/0210068 | A1 * | 9/2007 | Reusche et al. | 219/494 |
| 2008/0168599 | A1 * | 7/2008 | Caudill et al. | 4/541.1 |
| 2009/0126100 | A1 * | 5/2009 | Kenoyer et al. | 4/559 |

* cited by examiner

*Primary Examiner* — Jeffrey A Gaffin
*Assistant Examiner* — Olvin Lopez Alvarez
(74) *Attorney, Agent, or Firm* — Larry K. Roberts

(57) ABSTRACT

An embodiment of a spa control system includes a heater, a pump for circulating water through the pump, one or more sensors for monitoring temperature, and an electronic controller coupled to the heater, pump and sensor(s) for controlling the heater and pump based on the rate of change in temperature at the sensor(s). A method of controlling a heater in a spa with a spa control system is also disclosed.

25 Claims, 9 Drawing Sheets

SPA CONTROL WITH IMPROVED HEATER MANAGEMENT SYSTEM

This application is a continuation-in-part of an application filed by the same inventor on Sep. 28, 2009, application Ser. No. 12/586,712, titled "SPA CONTROL SYSTEM WITH IMPROVED FLOW MONITORING".

BACKGROUND OF THE INVENTION

1. Field of the Invention

This invention relates to spa control systems and, more particularity, to methods of measuring water flow through the heater of a spa, reporting flow status to the user, and monitoring spa water temperature in an energy-efficient manner.

2. Discussion of Related Art

For several years spa manufactures have been using two or more solid-state sensors to monitor water temperature in the spa as well as temperature somewhere near the heater. One sensor is needed to monitor temperatures at the heater according to the requirements in UL 1563, a standard for electric spas. Another sensor is usually located in the water of the spa to measure the temperature of the spa water.

In conjunction with solid-state sensors, a flow-monitoring device has also commonly been used. The spa industry has long used pressure switches in the plumbing as an indication that the circulation pump is running and water is present. This usage of pressure switches has the drawback that certain types of blockage can stop the flow of water but still indicate pressure in the plumbing from the pump. A better plan has been the usage of flow switches. Many spas being built today employ a flow switch to determine if it is appropriate to activate the heater. Flow switches are somewhat expensive, however, and often unreliable.

U.S. Pat. No. 5,361,215, Tompkins, et al, teaches the use of two temperature sensors to determine water flow though the heater. One sensor is upstream from the heater while the second sensor is downstream from the heater. A significant difference in temperature between the two sensors is an indication of a flow problem. In all cases, one of the sensors is in the spa water. The other sensor is near the heater. U.S. Pat. No. 6,282,370, Cline, et al, teaches the use of two sensors at separated locations on or within the heater to determine adaquate water flow through the heater and also to measure the temperature of the water in the spa. Again, the difference in temperature between the two sensors is used to evaluate the presence of water flow of through the heater.

The Cline approach has several disadvantages. The first problem is that the difference in temperature between the two sensors is very small, even with significant blockage in the plumbing. The Cline approach can be accurate only when the water flow is above some minimum level. This approach cannot, therefore, be used with low-flow heaters, which are popular in the spa industry. Another problem is that the spa water temperature is not known when the pump is off. The only way to learn the water temperature is to turn on the pump for a short period several times a day in order to measure the water temperature as it passes through the heater and to see if heat is needed. Clearly, this approach is not energy friendly.

SUMMARY OF THE INVENTION

The present invention teaches the use of a single temperature sensor in the body of the heater to monitor water flow conditions through the heater and to also measure water temperature in the spa. Water flow rates are estimated by the amount of time it takes for the heater to change from one temperature to another, with the pump running normally. The rate of change is, therefore, more important than the actual temperatures.

In a preferred embodiment, a thermistor is placed into a stainless steel closed-end tube and coupled to a microprocessor with wire connections. The tube may be filled with heat conductive epoxy to secure the thermistor in the tube. The tube is connected to the body of the heater with a compression fitting in a manner that will allow the end of the tube to be close to the heating element inside the heater.

Prior to a flow measurement, the circulation pump is activated for a short time to bring the temperature inside the heater to approximately the same temperature as the spa water. When the rate of change at the sensor in the heater becomes very small, it can be assumed that the heater measurement closely represents the temperature of the water in the vessel, even though the sensor is not in direct contact with the water in the vessel.

As soon as the temperature becomes stable, the pump is turned off and the heater is immediately turned on. After just a brief period of time, the heater is turned back off. Now with both the heater and the pump turned off, the sensor is monitored for heat rise. When a few degrees of heat rise occurs within a short period, say about 30 seconds, it is proven that the sensor is in place and working. The recorded temperature at the sensor at this time is the first temperature measurement in a future rate of change calculation.

Now, with a working sensor, the circulation pump is turned back on and the sensor is now watched for the effect of the cooling water. If, in a brief period, the sensor returns to a temperature near what it was before the heater was briefly energized, it is proven that flow exists. The recorded temperature at the sensor at this time is the second temperature measurement.

The difference between the first temperature measurement and the second temperature measurement is now divided by the amount of time between the measurements to arrive at a rate of change. If the rate of change is greater than a prescribed rate of change, the heater can now be safely turned on for as long as necessary to bring the spa water up to the desired temperature. (FIG. 6)

On the other hand, if the flow is inadequate, or there is no water in the heater, the temperature at the sensor will continue to increase for several more degrees. This would prove that there is no flow and the heater, therefore, cannot be turned on for a longer period of time. A flow problem may then be indicated to the user to explain why the heater is not energized. (FIG. 6)

With a known rate of change, user information can be provided in common units of flow by simply multiplying this rate of change by a constant factor. (FIG. 3) The constant factor may be arrived at by actual measurements. It is now possible to replace a standard error message, like "flow" with an estimated flow rate in, say, gallons/minute.

With the pump and heater now running normally, the next task is to watch for a loss of flow of water in the heater. This is accomplished by monitoring the sensor for a high rate of change in temperature whenever the heater is on. An increase of 3-4 degrees Fahrenheit in a period of 30 seconds, for example, would be a clear indication that flow, or water, has been lost. If this occurs, the heater will be deactivated immediately and a suitable indication will be provided to the user. (FIG. 6)

In normal operation, the temperature of the water in the spa may be reported to be the same as the temperature of the water passing through the heater and over the sensor, as long as the pump is activated. In some cases the pump will not be constantly activated, so the temperature of the spa water is unknown. The Cline patent addresses this problem by turning the pump on several times a day, just to check the water temperature and the possible need for heat.

The present invention solves these problems with artificial intelligence. Each time the pump and heater are activated due to an apparent need for heat, based on the water temperature inside the heater, or the length of time since the last heat cycle, the pump will be turned on long enough to compare the real water temperature with the estimated water temperature. Any difference will be recorded and applied as an offset to the next activation. New offset errors will recorded with future activations, adapting the process to changes in ambient conditions.

DESCRIPTION OF THE PREFERRED EMBODIMENTS

Figure 1:
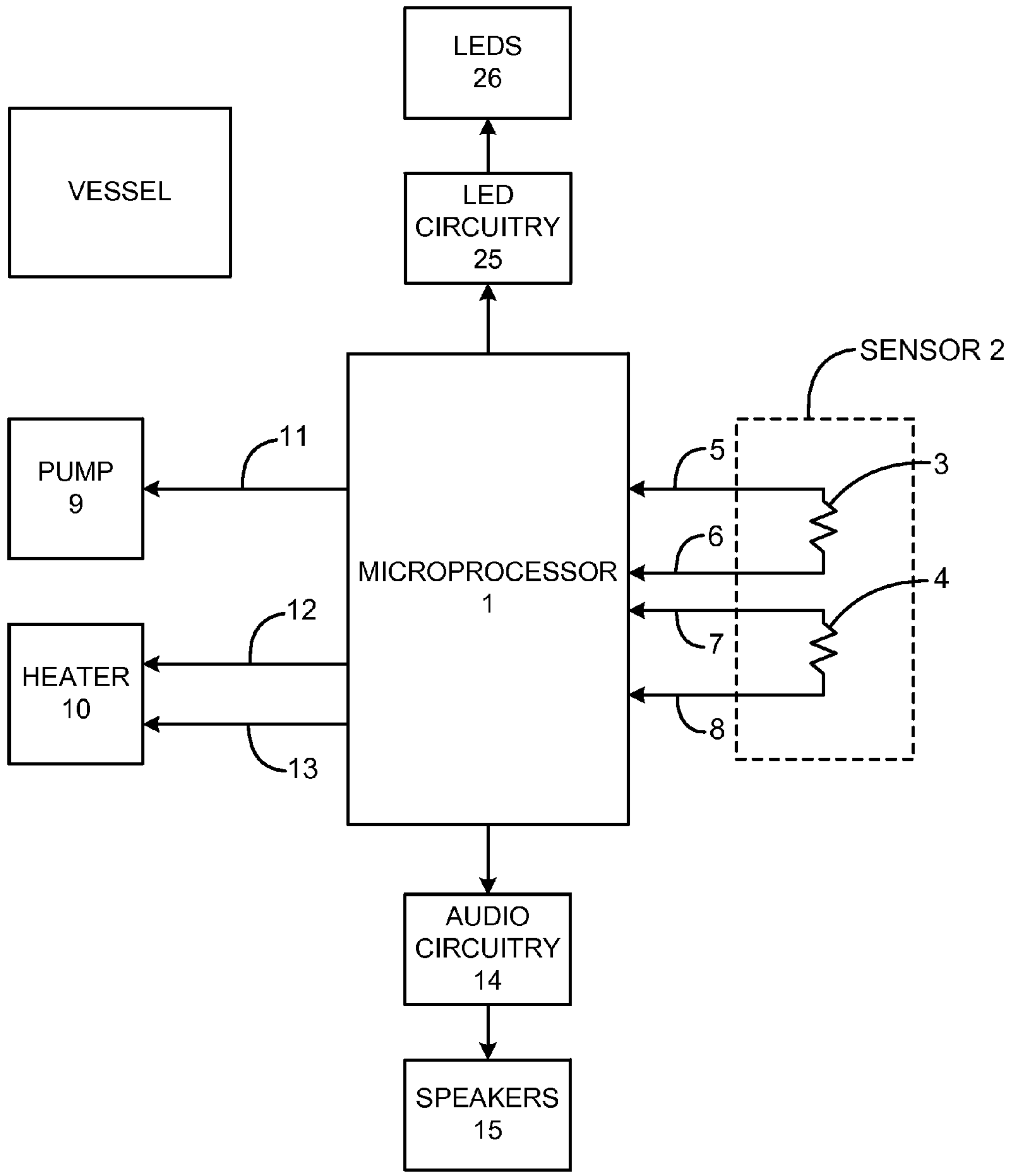
FIG. 1 illustrates a block diagram of the spa control system.
Figure 7:
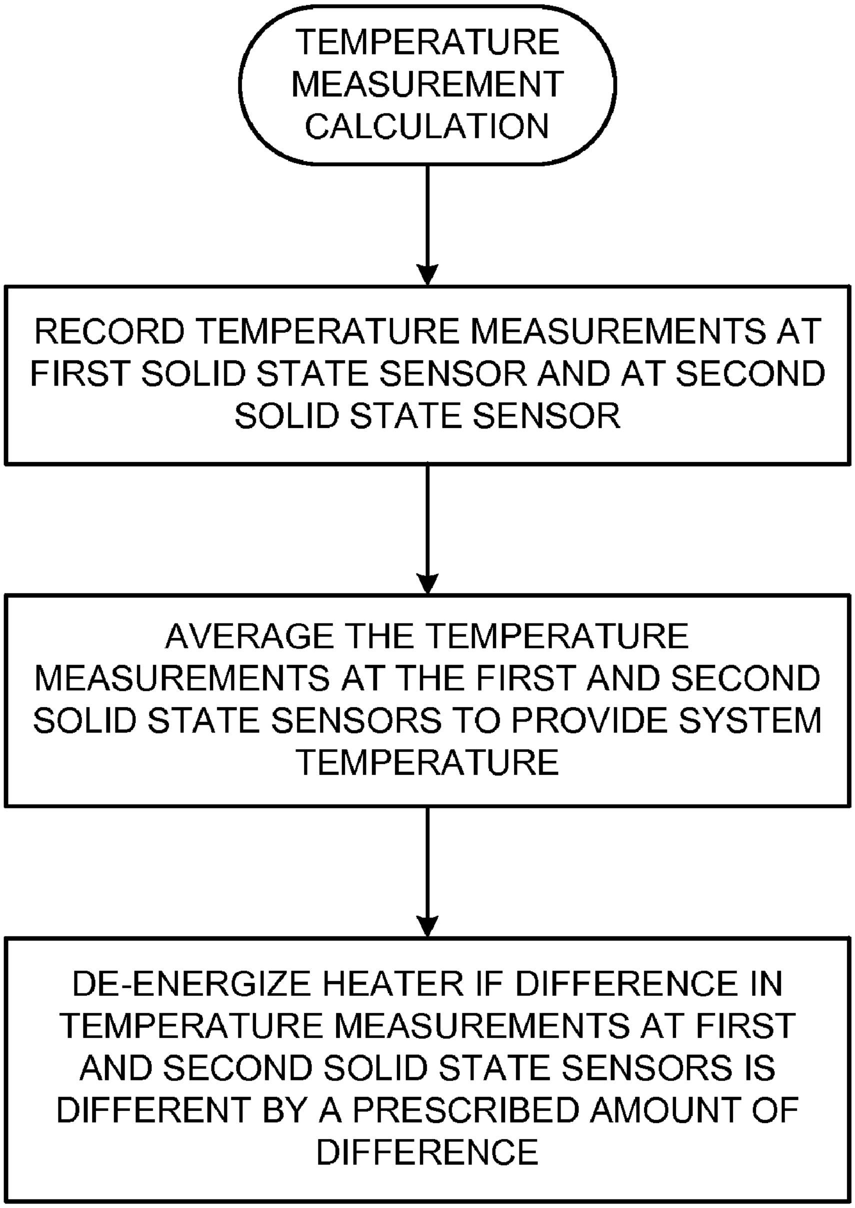

Referring now to FIG. 1, Sensor 2 is made up of dual, solid state temperature sensing elements Thermistor 3 and Thermistor 4 connected to separate input ports of Microprocessor 1 with wires 5, 6, 7, and 8. Thermistors 3 and 4 may share a common housing means, which is placed near the heating element of a spa heater. Both thermistors are not required for the invention but are included to meet the redundancy requirements of UL 1563 concerning independent circuits to control the heater. The measurements of the two thermistors may be averaged together for the purpose of controlling the water temperature. Since the thermistors are in exactly the same location, their temperature measurements should be nearly the same. If the two thermistors report measurements that are different by a prescribed amount, the microprocessor will de-energize the heater and indicate to the user that the sensor is defective. (FIG. 7)

In another, or the same, preferred embodiment, both measurements are constantly shown so that the user can see the nature of the problem, if any. This data is presented in lieu of error messages that contain no real information.

Pump 9 is coupled to microprocessor 1 through circuit means 11, which may include relays, relay drivers, wires, and connectors. Heater 10 is coupled to microprocessor 1 through redundant circuit means 12 and 13.

Figure 1A:
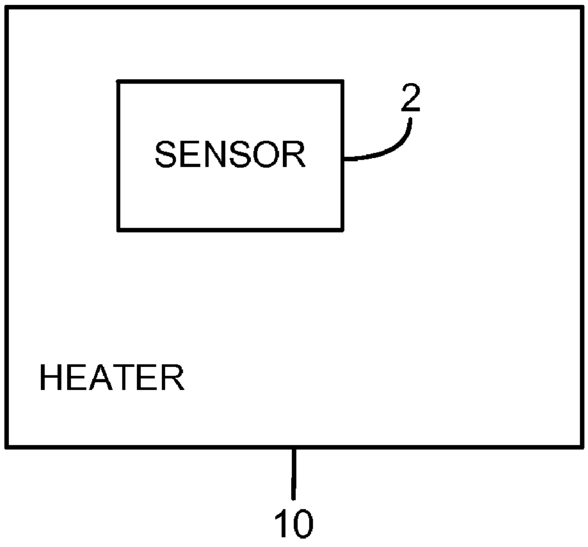
FIG. 1A schematically depicts a temperature sensor in a spa heater.

In operation, sensor 2 measures temperatures inside heater 10, which may, or may not, contain water. (FIG. 1A) The invention can be accomplished with sensor 2 mounted external to the heater housing, or mounted in a dry well arrangement; however, reaction times for problems are shorter if sensor 2 is in close proximity to the heating element of heater 10. This can be accomplished by providing a threaded hole in the heater housing and securing sensor 2 in the hole with a standard compression fitting.

Figure 3:
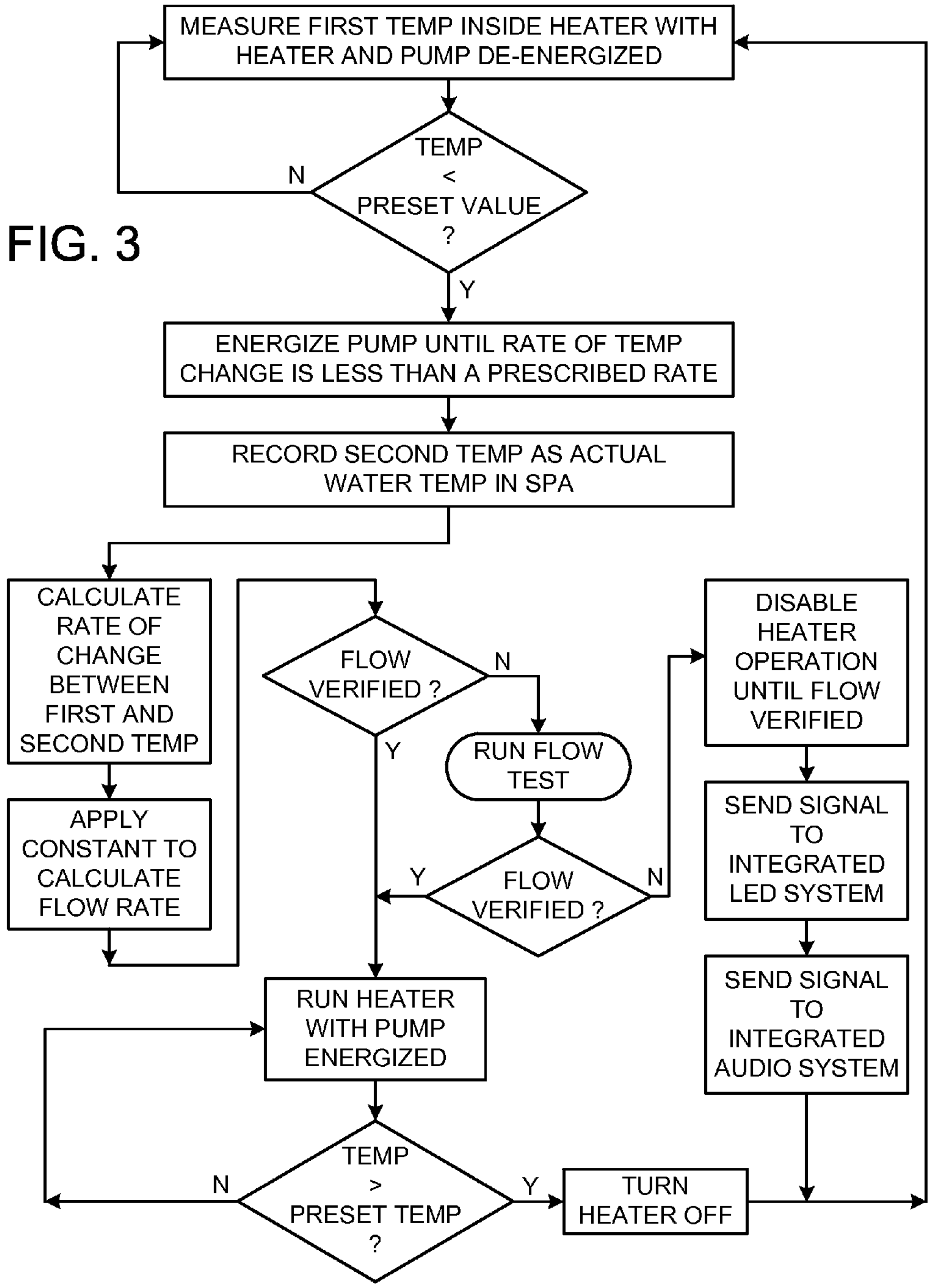
FIGS. 3-7 are flow diagrams illustrating features of operation of the spa control system.

When the temperature measurement of sensor 2 is less, by a prescribed amount, than the set temperature, maintained by microprocessor 1, microprocessor 1 will cause pump 9 to be energized in preparation for energizing heater 10, as soon as water flow is found to be adequate. Pump 9 will circulate water from the vessel containing water for one or two minutes, or until the rate of temperature change, as seen by sensor 2, is less than a prescribed rate of change. This stabilized temperature measurement will be recorded by microprocessor 1 as the actual water temperature in the spa prior to the flow test. (FIG. 3)

Figure 4:
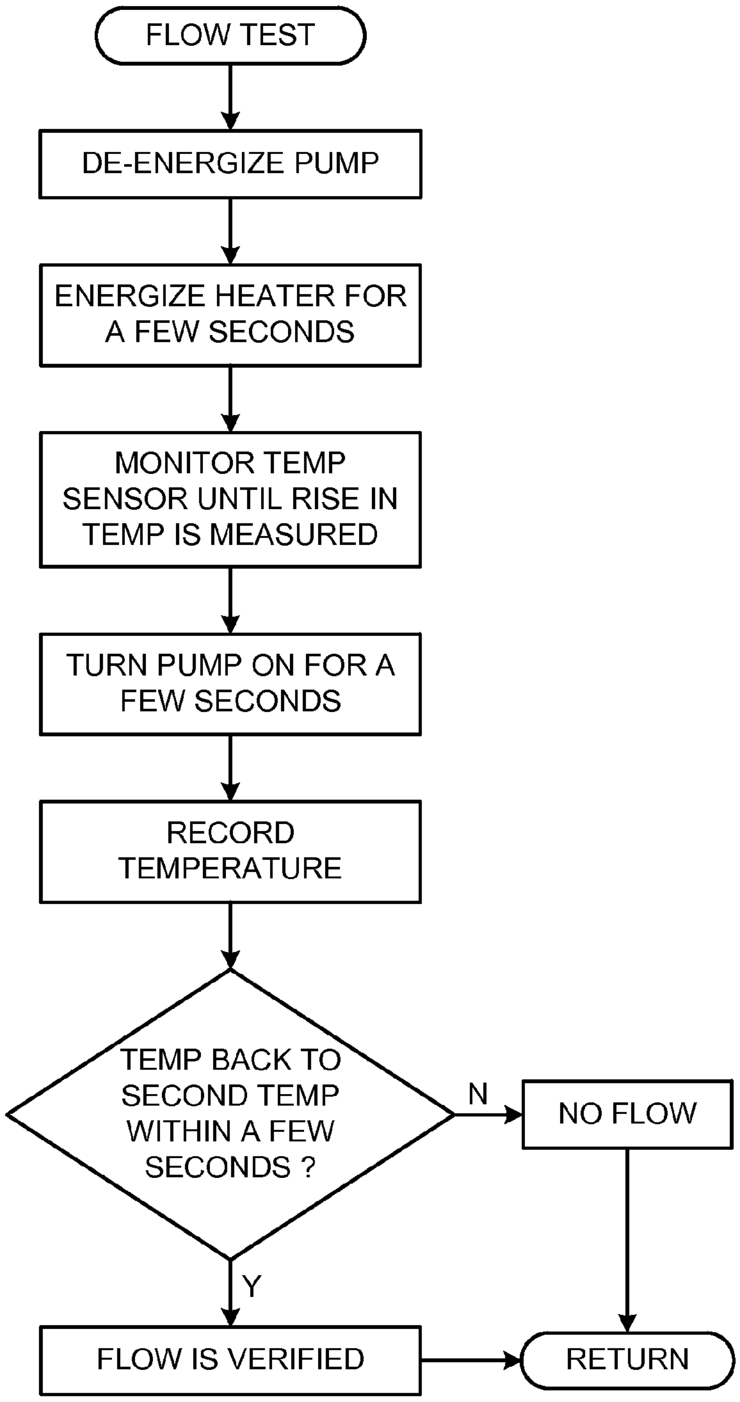

The first step in the flow test is to turn off, or de-energize, circulation pump 9. The next step is to turn on heater 10, but only for a few seconds. After heater 10 is turned back off, sensor 2 is monitored for a rise in temperature. With no circulation in heater 10, a rise of several degrees is expected within, say, 30 seconds. As soon as the desired rise is seen (perhaps 3-4 degrees), pump 9 is turned back on so that the cooling water can dissipate the recent heat rise within a few seconds. If the flow is good, the temperature at sensor 2 will return to near the water temperature recorded prior to the brief heater activation. Finally, now that flow has been verified, heater 10 can be turned or a longer period to heat the water to, or beyond, the set temperature. (FIG. 4)

If, however, the temperature continued to rise after pump 9 was turned on, a flow problem exists and heater 10 must be left off until the problem is resolved. A signal, such as a flashing LED, or a change of color somewhere on a user interface, can be provided to the user to explain why heating is not taking place. (FIG. 3)

It may not be necessary, in some cases, to create a heat rise by energizing the heater. If there is a significant difference between the spa water temperature and the heater temperature before the pump is first turned on, it may be possible to estimate a flow rate by monitoring the change in heater temperature as the spa water is circulated through the heater. If the spa water is 100 F., for example, and the heater has cooled to 96 F., it is a simple manner to measure the time required to bring the heater up to near the water temperature, or some number of degrees of change. A change of 2 degrees in 20 seconds, for example, represents twice the flow rate of 2 degrees in 40 seconds. A factor may then be applied to the resulting rate to closely relate to a flow measurement in, say, gallons per minute.

Use of the present invention is not restricted to spas with a high rate of water flow through the heater.

A temperature difference between two reference points at the heater is not used, but rather a cooling rate of change. Because only a small amount of flow is required to make an accurate measurement, the invention can be used on spas with low water flow, or vertical, heaters.

Flow problems can later occur due to blockage or water loss. Sensor 2 must be carefully monitored for a rapid increase in temperature inside the heater, or for an increase in temperature over a longer period of time that is unreasonable and indicative of a dirty filter, for example. Comparing the rise in temperature with the time required to reach that temperature does this. If the rate of change is greater than a prescribed rate, poor flow may be causing the heater to become hotter than the water in the vessel. Heater 10 will be de-energized immediately and another flow test attempted.

As a further improvement over the prior art, a method for preventing short heating cycles is taught in the present invention. With pump 9 not running and only one sensor in the system, the water temperature in the vessel may be different than the water temperature in heater 10, due to the differences in volume and location. If sensor 2 measures a temperature lower than the set temperature, microprocessor 1 will normally turn on pump 9 and heater 10 to reach, at least, the set temperature. If the spa water was not as cold as the heater 10 temperature, which caused pump 9 to be turned on, pump 9 will quickly turn back off as soon as the real water temperature is seen by sensor 2.

This problem can be solved through the use of artificial intelligence. Microprocessor 1 can keep a record of the differences between the apparent water temperature in heater 10 and the real water temperature as will be discovered when pump 9 is turned on and run for a minute or two. This difference can now be applied as a calculated temperature offset to the next heater 10 temperature measurement. For example, if the set temperature is 100 degrees, pump 9 will be turned on at perhaps, 99 degrees. Once pump 9 has circulated the spa water through heater 10 it may be seen that it was unnecessary to turn on pump 9 with only one degree of difference, so one degree of offset will be added to the heater temperature before pump 9 is turned on again at 98 degrees. This process will continue until the heater temperature with the offset added closely matches the actual spa water temperature when the pump is first activated in preparation of a heating cycle. (FIG. 5) An additional improvement may be made after observing the rate of change in the heater temperature while the pump is off. In the previous example, the offset may be adjusted to a larger number, perhaps five degrees, if the heater is found to be cooling very quickly. (FIG. 5A) This would provide a closer match between the water in the vessel and the user preferred temperature at the time the pump and heater are turned on.

Figure 5:
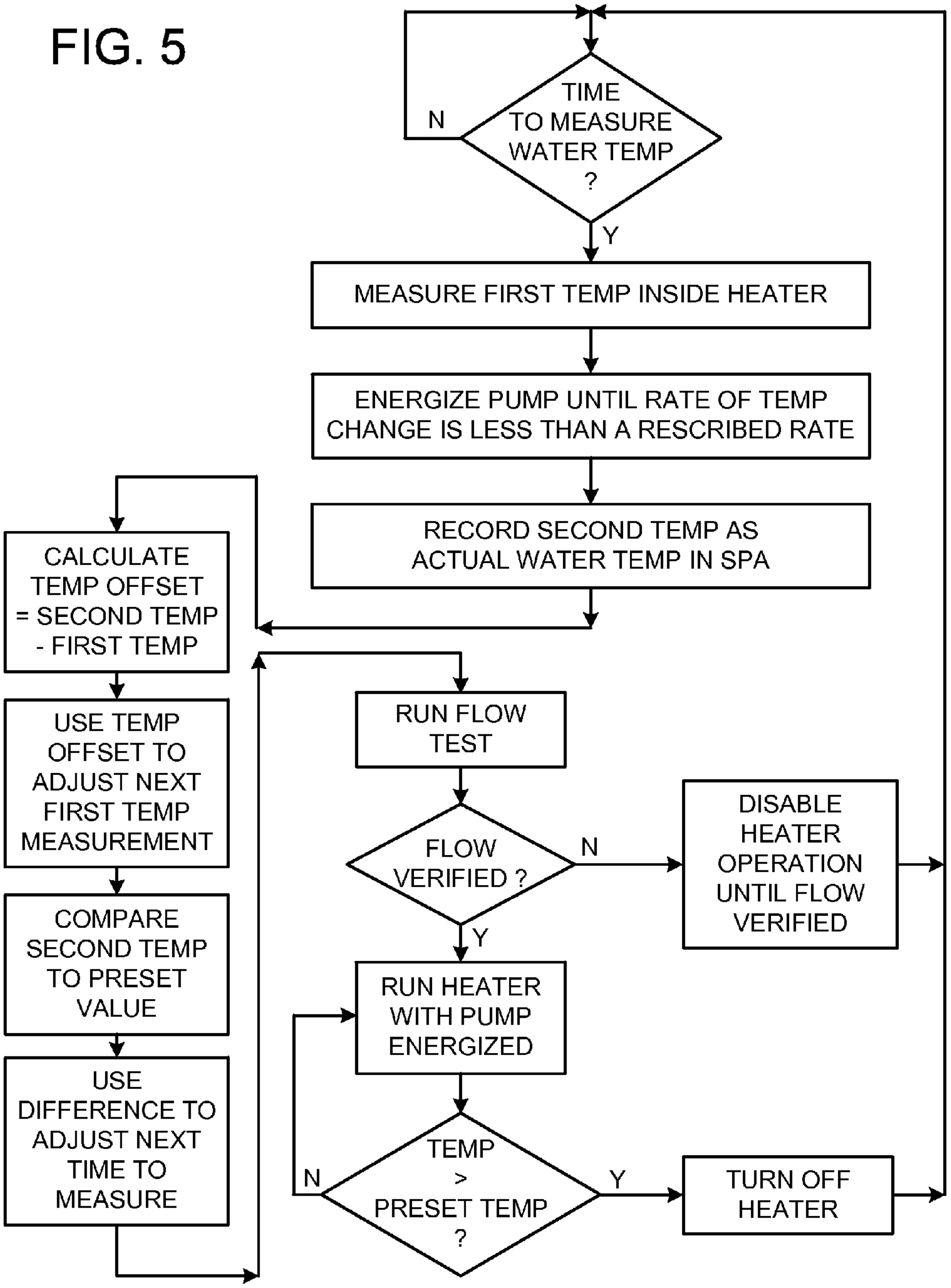
Figure 5A:
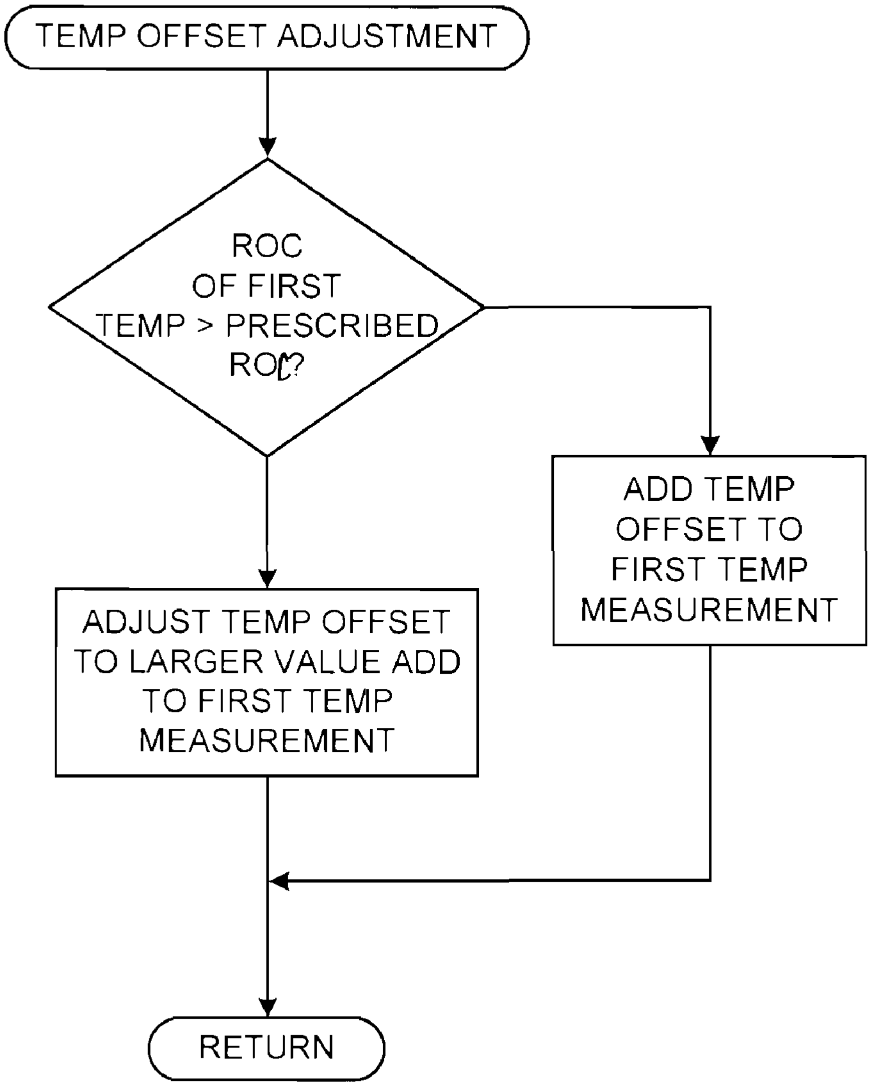
Figure 6:
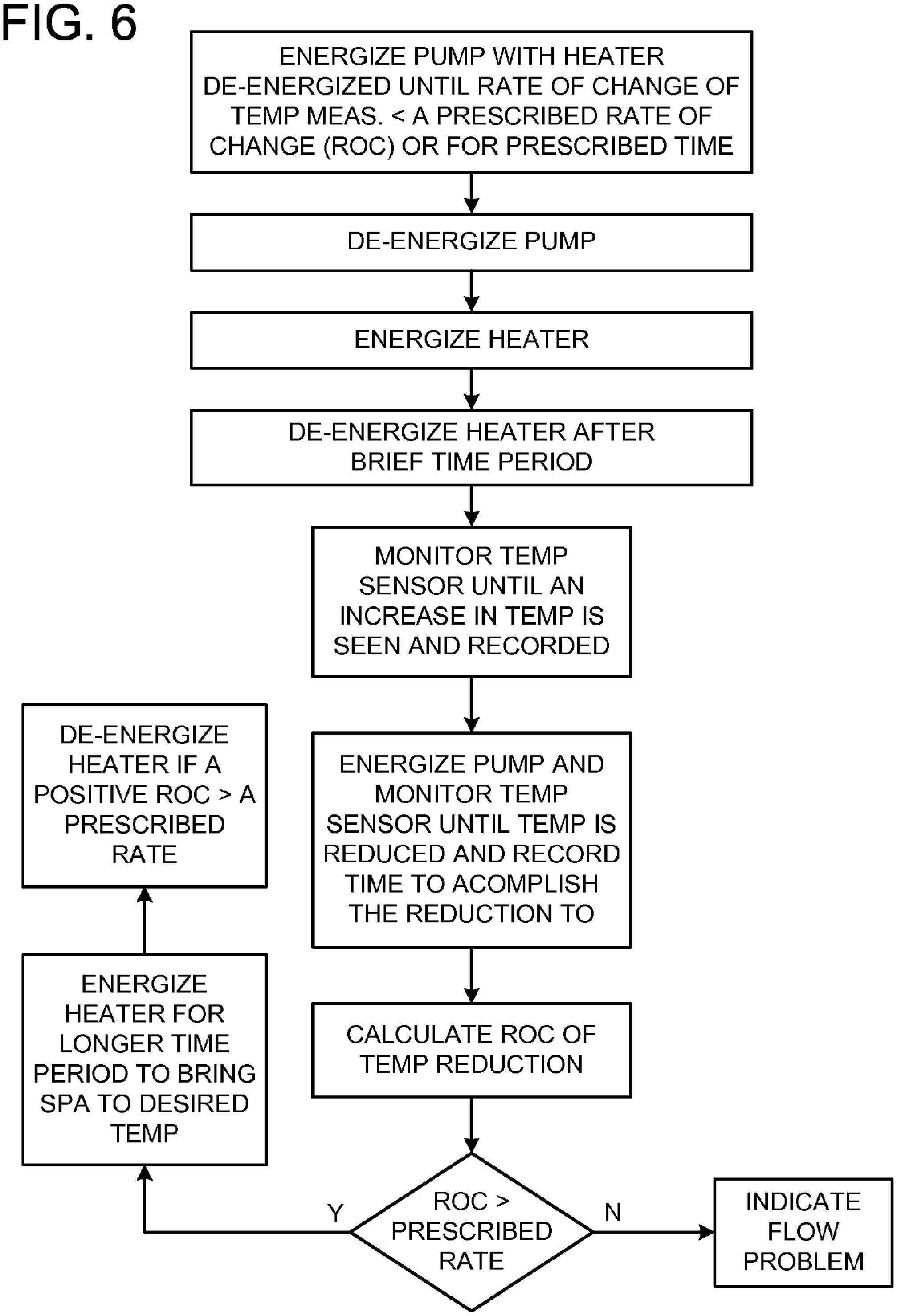

In another, or the same, preferred embodiment, the pump is turned on to check for water temperature after a certain period of time has passed. This period of time is constantly adjusted by adding or subtracting time, based on the accuracy of the most recent period of time in determining the true need for heating. For example, if the requirement is to activate the heater only after the spa water has dropped 1 degree lower than the set temperature, then the comparison of real water temperature to set temperature minus 1 degree will yield a difference of some number of degrees. The number of degrees thus found as a difference will be the basis for adding or subtracting time for the next period for the pump to be off. (FIG. 5)

Assume, for example, the set temperature is 100 F., and the pump has been off for 120 minutes. The prescribed water temperature to turn the heater on may be 99 F. When the pump is turned on after 120 minutes and the temperature at the heater sensor stabilizes at, say, 98 F., it will be known that the pump has been off too long. The previous 120 minute period may now be reduced by 30 minutes, to a new value of 90 minutes. If, however, the stabilized water temperature was only 97 F., a bigger adjustment may be in order. Based on a change of 30 minutes for each degree of error, the new period may be adjusted to 60 minutes. Obviously, a certain amount of time can be added to the next period if the actual water temperature is higher than the target temperature. (FIG. 5)

Figure 2:
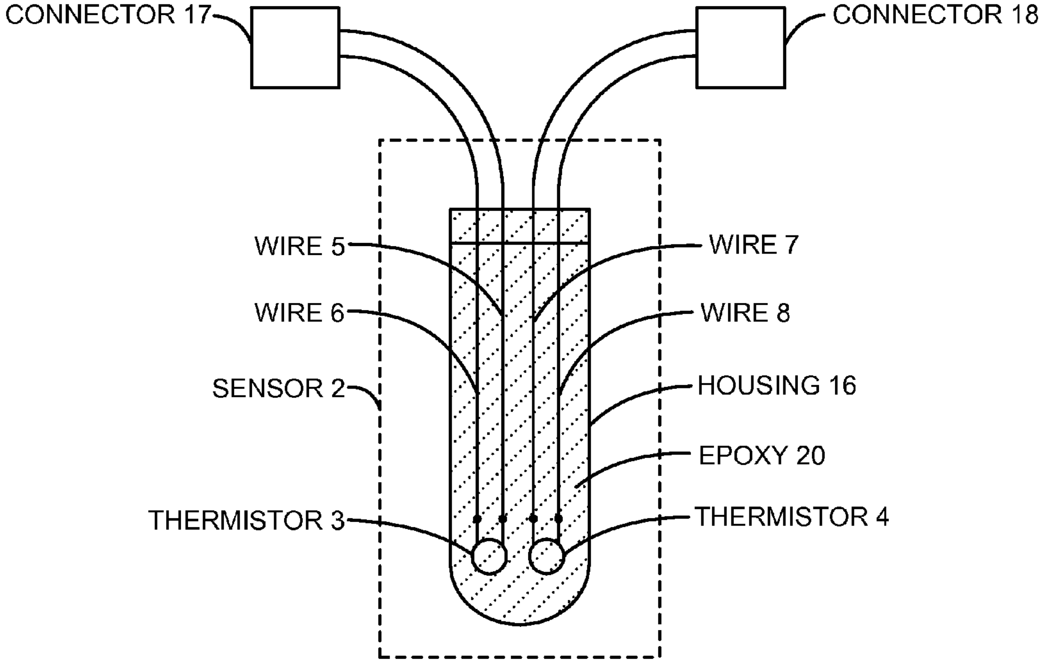
FIG. 2 illustrates a temperature sensor with redundant thermistors.

FIG. 2 illustrates a possible construction of sensor 2. Two solid-state sensor elements are represented by thermistor 3 and thermistor 4. Devices other than thermistors, such as PN junctions, are also well known for this type of application. Only thermistor 3 or thermistor 4 is required for the invention to operate as described. UL standard 1563 for electric spas, however, requires totally redundant circuitry to control each power line of a spa heater, so it is convenient to place two thermistors at the same location in the heater.

Housing 16 of sensor 2 may be a closed end stainless steel tube of a size that fits into the heater using a standard compression fitting. Thermistor 3 is attached to connector 17 with wires 5 and 6 suitable for the purpose. Thermistor 4 is attached to connector 18 with wires 7 and 8.

After thermistor 3 and thermistor 4 are placed in housing 16, housing 16 may be filled with a heat conductive epoxy or similar material, as long as the material is not electrically conductive. Connectors 17 and 18 provide electrical coupling to a microprocessor through circuitry means.

Referring again to FIG. 1, microprocessor 1 is connected to colored LEDs 26 by way of LED circuitry 25, and to speaker 15 by way of audio circuitry 14. With this integrated design, it is a simple matter for the user communication means to indicate system status and heater management problems to the user. In another, or the same, preferred embodiment, decorative LEDs 26 are used to flash red LEDs if the water is hotter than the set temperature and to flash blue LEDs if the water is colder than the set temperature. The flash rate may be related to the differences, so that a very fast flash of the red LEDs within LEDs 26 may indicate that the water is so hot that a high limit condition has been reached. Likewise, a very fast flash rate of the blue LEDs within LEDs 26 may indicate that the spa's plumbing is in danger of freezing. Another LED color, such as yellow, may be used to show that the water flow is inadequate and caution must be used, because the spa is unable to heat the water.

In another, or the same, preferred embodiment, the integrated audio system shown in FIG. 1 is used to speak to the user. An error condition, such as water that is too hot, too cold, or not flowing, is communicated from microprocessor 1 to the user by speaker 15, coupled through audio circuitry 14, which includes a voice synthesizer.

Others skilled in the art of spa control design may make changes to what is taught within this invention without departing from the spirit of the invention.

What is claimed is:

1. A spa control system comprising:
- a vessel for holding water;
- a heater for heating said water;
- a pump for circulating said water through said heater;
- a temperature sensor for measuring temperature of said water at a single location in the heater;
- a microprocessor coupled to said heater, said pump, and said temperature sensor for the purpose of controlling said heater and said pump based on the rate of change in temperature at said temperature sensor; and
- wherein said microprocessor records a first temperature measurement at said temperature sensor while said pump and said heater are de-energized and records a second temperature measurement after said pump has been energized for a period of time, with said microprocessor controlling said heater according to the rate of change between said first temperature measurement and said second temperature measurement.

2. The system in claim 1, wherein said system contains only one temperature sensor.

3. The system in claim 1, wherein said heater is briefly energized prior to said pump being energized.

4. The system in claim 3, wherein said pump circulates water through said heater before said heater is briefly energized for a prescribed period of time or until the rate of change of said temperature measurement at said sensor is less than a prescribed rate of change.

5. The system in claim 4, wherein said temperature measurement after said rate of change is less than a prescribed rate of change is used to represent the temperature of the water in said vessel.

6. The system in claim 1, wherein said temperature sensor comprises more than one solid state temperature sensing elements positioned adjacent to each other in a common housing to provide redundancy for the sensor function.

7. The system of claim 6, wherein measurements of said sensing elements are compared by said microprocessor so that whenever said measurements are different by a prescribed amount of difference said microprocessor de-energizes said heater.

8. The system in claim 1, wherein said rate of change is multiplied by a constant factor to provide user information in common units of flow measurement.

9. The system in claim 1, wherein said heater is designed for low water flow.

10. The system in claim 1, wherein colored lights are used to signal the user that said water is too hot or too cold or not flowing through said heater.

11. The system in claim 1, wherein audio signals are used to signal the user that said water is too hot or too cold or not flowing through said heater.

12. The system of claim 1, wherein said heater is de-energized whenever said sensor detects a positive rate of change of temperature sensed by said temperature greater than a prescribed rate of change.

13. A spa control system comprising:

a vessel for holding water;

a heater for heating said water;

a pump for circulating said water through said heater;

a sensor for measuring temperature at or in the heater;

a microprocessor coupled to said heater, said pump, and said sensor for the purpose of controlling said heater and said pump, the microprocessor configured so that said pump is turned on at a time when said water has cooled to a prescribed temperature, wherein said pump is activated when said temperature observed at said sensor as adjusted by a calculated temperature offset drops to the prescribed temperature, and wherein, when the rate of change in said temperature observed at the sensor with the pump turned off is greater than a prescribed rate of change, said calculated temperature offset is increased.

14. The system in claim 13, wherein said sensor in not in direct contact with said water in said vessel.

15. The system in claim 13, wherein said pump is turned on after a period of time which results in energizing said pump at a time when said water has cooled to a prescribed temperature observed at the sensor as adjusted by said calculated temperature offset.

16. The system in claim 15, wherein differences in said prescribed temperature and the observed temperature at said sensor, when the rate of change in said temperature is less than a prescribed rate of change, are used to adjust said period of time.

17. A method of controlling a heater in a spa with a spa control system having one or more temperature sensors in said system, comprising:

de-energizing a pump that normally circulates water through said heater;

energizing said heater;

de-energizing said heater after said heater has been energized for a brief period of time;

monitoring the temperature at said heater with said sensor until an increase in temperature is seen and recorded;

energizing said pump and monitoring said temperature at said heater until said temperature is reduced by moving water from said pump and recording the time required to accomplish said reduction in said temperature;

calculating the rate of change of said reduction and energizing said heater for a longer period of time only if said rate of change is greater than a prescribed rate of change.

18. The method of claim 17, wherein said system contains only one of said temperature sensors.

19. The method in claim 18, wherein said pump circulates said water through said heater while said heater is de-energized until the rate of change in temperature measurements at said sensor is less than a prescribed rate of change prior to applying said method.

20. The method of claim 17, wherein additional temperature measurements are made while said heater is energized for said longer period of time for the purpose of de-energizing said heater if a positive rate of change of said temperature is greater than a prescribed rate of change.

21. A spa control system for a spa including a vessel for holding water, a heater for heating the water, and a pump for circulating said water through the heater, the spa control system comprising:

a temperature sensor for measuring temperature of the water at a single location in the heater;

a microprocessor configured to be coupled to the heater, the pump, and said temperature sensor for the purpose of controlling the heater and the pump based on a rate of change in temperature at said temperature sensor; and wherein said microprocessor records a first temperature measurement at said temperature sensor while the pump and the heater are de-energized and records a second temperature measurement after the pump has been energized for a period of time, with the microprocessor controlling the heater according to the rate of change between said first temperature measurement and said second temperature measurement.

22. The system of claim 21, wherein the microprocessor is configured to briefly energize the heater prior to the pump being energized.

23. The system of claim 22, wherein the microprocessor is configured to energize the pump to circulate water through the heater before the heater is briefly energized for a prescribed period of time or until the rate of change of said temperature measurement at said sensor is less than a prescribed rate of change.

24. The system of claim 21, wherein said microprocessor is configured to de-energize the heater whenever said sensor detects a positive rate of change of temperature sensed by said temperature greater than a prescribed rate of change.

25. The system of claim 21, wherein said system utilizes only said temperature sensor at said single location for controlling the heater and the pump.

* * * * *